United States Patent
Shin et al.

(10) Patent No.: US 9,639,977 B2
(45) Date of Patent: May 2, 2017

(54) PROCESSING MODEL DATA REPRESENTING A BIOLOGICAL BODY SECTION HAVING A DEFECT PORTION

(71) Applicant: Medizinische Hochschule Hannover (MHH), Hannover (DE)

(72) Inventors: Hoen-oh Shin, Hannover (DE); Harald Essig, Zurich (CH)

(73) Assignee: Medizinische Hochschule Hannover (MHH), Hannover (DE)

(*) Notice: Subject to any disclaimer, the term of this patent is extended or adjusted under 35 U.S.C. 154(b) by 302 days.

(21) Appl. No.: 14/324,128

(22) Filed: Jul. 4, 2014

(65) Prior Publication Data

US 2015/0009209 A1    Jan. 8, 2015

(30) Foreign Application Priority Data

Jul. 5, 2013 (EP) .................................. 13003407

(51) Int. Cl.
G06T 17/00 (2006.01)
G06T 7/60 (2017.01)
G06T 19/20 (2011.01)

(52) U.S. Cl.
CPC .............. *G06T 17/00* (2013.01); *G06T 7/608* (2013.01); *G06T 19/20* (2013.01); *G06T 2207/10072* (2013.01); *G06T 2207/30004* (2013.01); *G06T 2219/008* (2013.01); *G06T 2219/2016* (2013.01)

(58) Field of Classification Search
None
See application file for complete search history.

(56) References Cited

U.S. PATENT DOCUMENTS

| 2006/0094951 | A1 | 5/2006 | Dean et al. |
| 2008/0021502 | A1* | 1/2008 | Imielinska ............. A61B 6/032 607/1 |
| 2011/0016690 | A1 | 1/2011 | Narainasamy et al. |
| 2012/0035888 | A1* | 2/2012 | Shin .................... G06F 19/3437 703/1 |

OTHER PUBLICATIONS

Liu, "Symmetry and asymmetry analysis and its implications to computer-aided diagnosis: A review of the literature", Journal of Biomedical Information, vol. 42, pp. 1056-1064 (2009).

Mertens et al., "Image data based reconstruction of the midface using a patient-specific implant in combination with a vascularized osteomyocutaneous scapular flap", Journal of Cranio-Maxillo-Facial Surgery, pp. 1-7 (2012).

(Continued)

*Primary Examiner* — Vu Nguyen
(74) *Attorney, Agent, or Firm* — Caesar Rivise, PC

(57) ABSTRACT

A method of processing model data representing a body section with bilateral symmetry of a biological organism is proposed that comprises the steps of providing object imaging data representing the body section having one or more defect portions; calculating a longitudinal axis and a lateral axis of the body section based on mathematical analysis of the object imaging data; and determining a mirror plane based on the calculated longitudinal and lateral axes. Said mirror plane allows for reconstructing the one or more defect portions by mirroring one or more corresponding portions having no defects at the mirror plane.

15 Claims, 5 Drawing Sheets

(56) References Cited

OTHER PUBLICATIONS

Mertens et al., "Image data based reconstruction of the midface using a patient-specific implant in combination with a vascularized osteomyocutaneous scapular flap", Journal of Cranio-Maxillo-Facial Surgery, vol. 41, pp. 219-225 (2013).
Tang et al., "Towards more Accurate 3D Face Registration under the Guidance of Prior Anatomical Knowledge on Human Faces", 8th IEEE International Conference on Automatic Face & Gesture Recognition, pp. 1-6 (2008).
Zhang et al., "3D face authentication and recognition based on bilateral symmetry and analysis", Visual Comput, vol. 22, pp. 43-55 (2006).

* cited by examiner

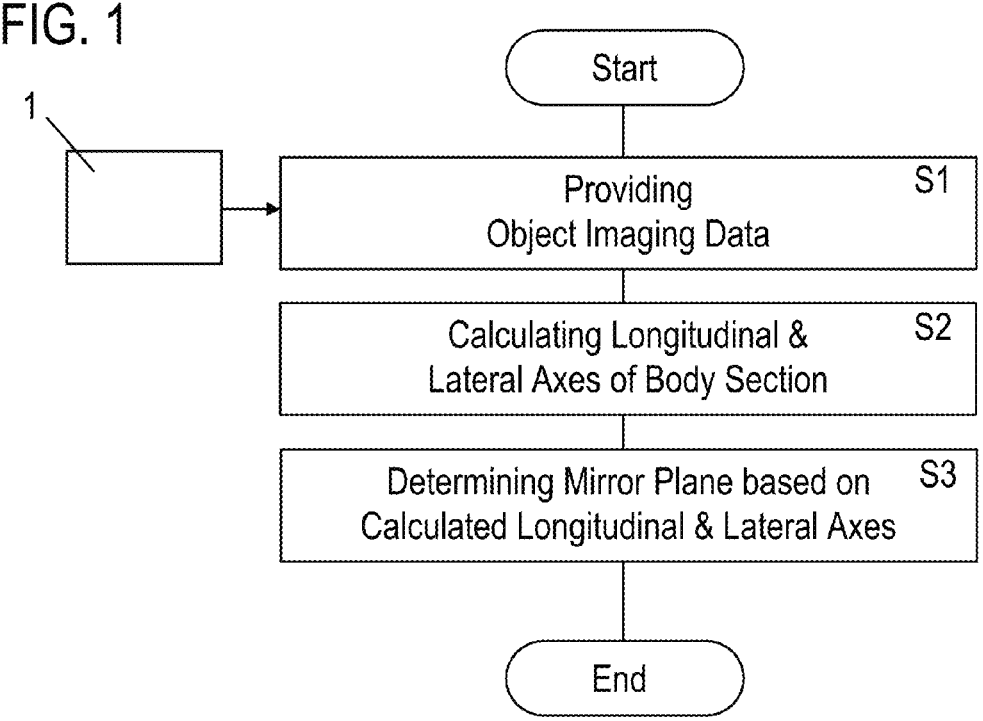

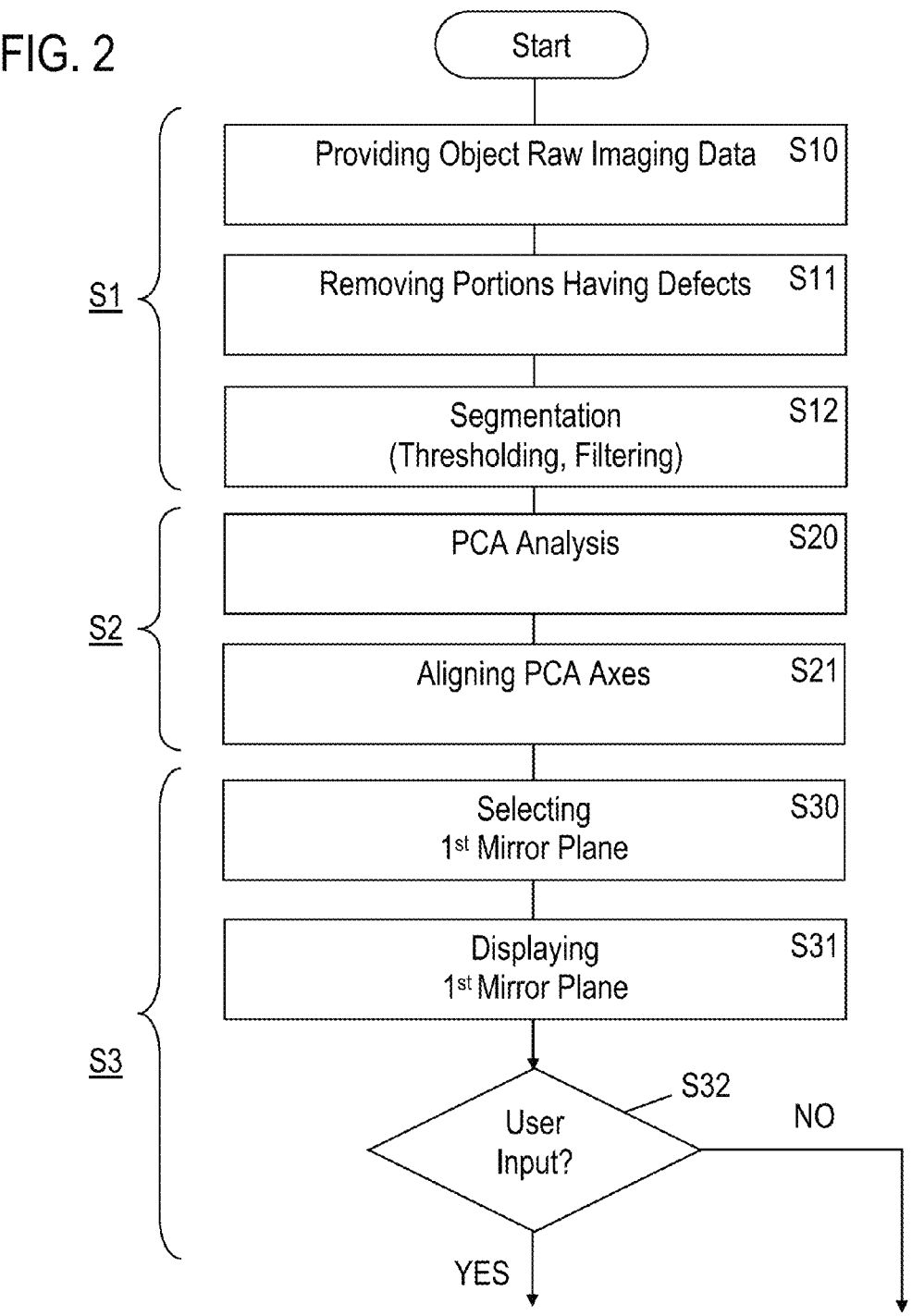

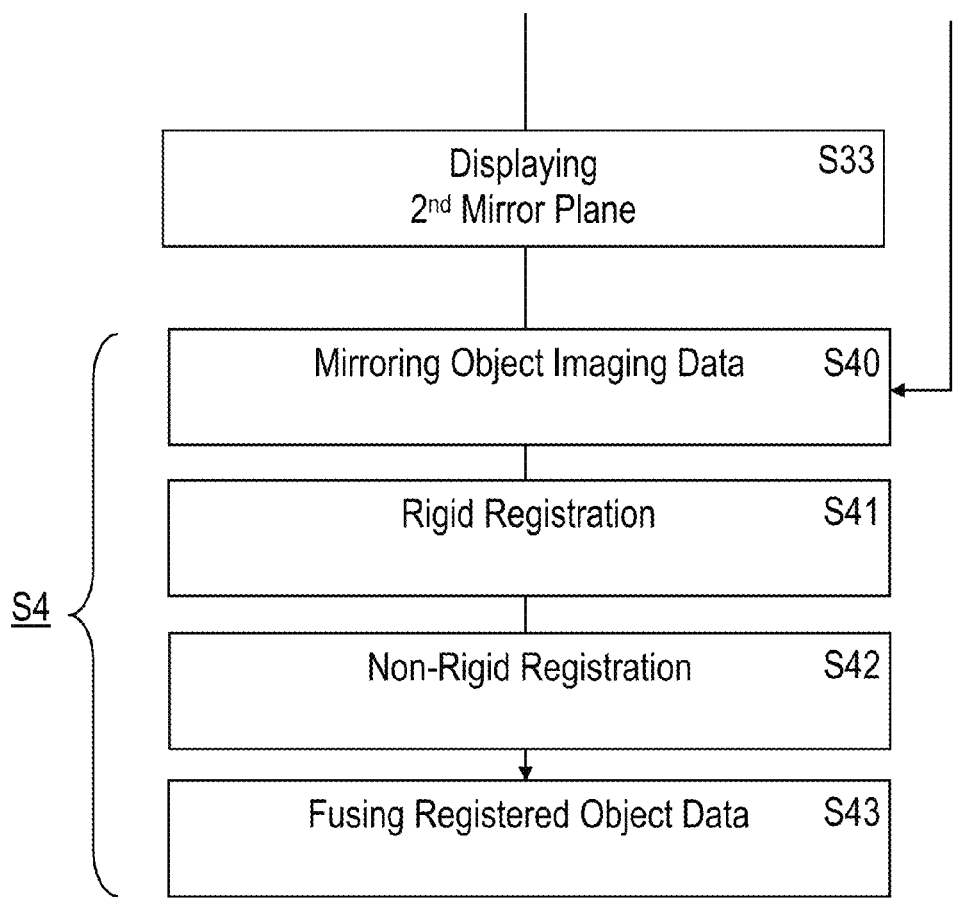

PROCESSING MODEL DATA REPRESENTING A BIOLOGICAL BODY SECTION HAVING A DEFECT PORTION

FIELD OF THE INVENTION

The present invention relates to a method of processing model data representing a body section of a biological organism that is bilaterally symmetric and comprises one or more defect portions.

Furthermore, the present invention relates to a computer program product residing on a computer-readable medium and including a program code for carrying out the method of processing model data and to a medical device comprising a processing unit for carrying out the method of processing model data. Applications of the invention are present in the fields of creating virtual or real models of biological body sections or parts thereof, used e.g. for operative planning, supporting surgical operations and/or making implants.

BACKGROUND OF THE INVENTION

Computer-assisted surgery (CAS) is a generally known and practically used surgery method, wherein a surgical operation is planned and/or conducted using a 3D model of a body section to be treated. In particular, the 3D model can be used for planning the steps of a surgical operation, e.g. the motion and adjustment of surgical tools or implants, for monitoring the surgical operation, or for constructing a real 3D implant. Typically, the 3D model can be generated on the basis of image data collected with medical imaging of a patient, e.g. by an image registration of Computed Tomography (CT) data or magnetic resonance imaging (MRI) data of the body section with CT or MR data of a certain portion of the body section.

If image data of a complete body section are not available, e.g. due to a defect such as destruction after an accident or a disease, or due to a congenital defect, generating model data for a 3D model requires a completion of the collected real image data with reconstructed data. As an example, CAS applications in Cranio-Maxillar-Facial surgery (CMF surgery) may require a reconstructed patient 3D model for obtaining complete skull image data.

Most animals are bilaterally symmetric, including humans. Animals that are bilaterally symmetric have a mirror symmetry in the sagittal plane, which divides the body vertically into left and right halves, with one of each sense organ and limb pair on either side. This is also referred to as plane symmetry. Furthermore, also individual body sections, organs, etc. may have a mirror symmetry, meaning that they could be divided into matching halves by drawing a line or plane down the center, so that the right half is a mirror image of the left half.

With one-sided defects of a body section with mirror symmetry, completion of collected data can be obtained by mirroring of the healthy half to the pathological half (see C. Mertens et al., Image data based reconstruction of the midface using a patient-specific implant in combination with a vascularized osteomyocutaneous scapular flap, Journal of Cranio-Maxillo-Facial Surgery (2012), http://dx.doi.org/10.1016/j.jcms.2012.09.003). With two-sided defects, mirroring of the healthy portions to the pathological portions is also possible if an anatomical region is not affected by corresponding defect portions on both sides of the mirror plane.

According to a proposed solution in the prior art, the mirror plane is positioned and drawn manually in the imaging data during preoperative planning by an expert, e.g. a surgeon. This process is a very time-consuming preoperative planning step because the result must be checked several times and the plane of symmetry must be repeatedly adjusted. As a further disadvantage, when performed manually, this 3D positioning of the plane of symmetry is prone to failures since the quality of the resulting 3D model essentially depends on the experience of the surgeon.

OBJECTIVE OF THE INVENTION

The objective of the invention is to provide an improved method of processing model data representing a body section with mirror symmetry and having one or more defect portions capable of avoiding disadvantages of conventional techniques. In particular, the objective is to provide a method which enables generating model data with reduced time expenditure for the user, with improved quality and/or with an increased independency of the surgeon's experience.

SUMMARY OF THE INVENTION

The above objective is solved by a method comprising the features of the independent claims. Advantageous embodiments of the invention are defined in the dependent claims.

A method of processing model data representing a body section of a biological organism, in particular model data representing a body section with mirror symmetry and having one or more defect portions is proposed.

In accordance with an aspect of the invention, object imaging data representing the body section having one or more defect portions are provided. A longitudinal axis and a lateral axis of the body section are calculated or approximated based on a mathematical analysis of the object imaging data. The longitudinal axis is an axis along the lengthwise direction of the body section, usually passing through its centre of gravity. The lateral axis is an axis along the widthwise direction of the body section, different from the longitudinal axis.

Based on the calculated longitudinal and lateral axes, a mirror plane of the body section is determined, said mirror plane allows for reconstructing the one or more defect portions by mirroring one or more corresponding portions having no defects at the mirror plane. By way of example, the body section may comprise at least one of a skull, a head or part thereof, and the calculated longitudinal and lateral axes correspond to the longitudinal and lateral axes of the head, or skull or part thereof. In this example, the mirror plane comprises the longitudinal axis and is perpendicular to one of the lateral axes so that the mirror plane corresponds to the sagittal plane.

The inventors have found that typical defects of body sections resulting from accidents, diseases, or congenital defects that can be treated using surgical procedures are such that the resulting imaging data of the body section still comprise sufficient inherent anatomical and/or morphological information that can be analyzed mathematically to determine or at least approximate the longitudinal and lateral axes of the body section.

Contrary to conventional methods of processing model data, the inventive method represents a universal, automatic approach for identifying the mirror plane of the body section under investigation. High quality models based on the determined mirror plane can be obtained in a reproducible manner independently of the individual experience and skills of the user. As an advantage, the proposed method can be applied to any part with mirror symmetry of a body of a biological organism. Reconstructing defect portions by mirroring corresponding healthy portions on the mirror plane allows to better take into account the patient-specific anatomy when reconstructing defect portions.

In order to increase the accuracy when determining the mirror plane, it is preferable that a size of the body section used for imaging is selected such that a size of the one or more defect portions is small compared to the body section. Advantageously, the size of the body section used for imaging is selected such that the size of the one or more defect portions is smaller than 50% of the size of the body section.

In accordance with an aspect of the invention, the mathematical analysis may include a statistical analysis of the object imaging data. As an example, the statistical analysis may be based on linear regression.

According to further advantageous embodiments, the statistical analysis may include a principal component analysis (PCA), also referred to as Karhunen-Loève-transformation. PCA represents an orthogonal linear transformation that transforms the (image) data to a new coordinate system such that the greatest variance by any projection of the data comes to lie on the first coordinate, i.e. the first principal component and defining a first eigenvector, the second greatest variance on the second coordinate, and so on. When applied to imaging data representing a body section, these properties of the PCA may be used for determining the spatial orientation and center of gravity of the body section. In particular, the axes corresponding to the first two principal components of the PCA (for two-dimensional imaging data) and corresponding to the first three principal components of the PCA (for three-dimensional imaging data) correspond to or at least approximate the longitudinal and lateral axes of an object having mirror symmetry. The longitudinal and lateral axes of the body section correspond to the orthogonal eigenvectors of the PCA covariance matrix.

By way of example, PCA when applied to imaging data of a skull will result in a first principal component or eigenvector corresponding to or approximating the longitudinal axis of the skull. The second principal component or eigenvector corresponds to or approximates the lateral axis of the skull. The third principal component or eigenvector corresponds to or approximates another lateral axis of the skull which is orthogonal to the plane defined by the first two PCA eigenvectors. Thus, the mirror plane corresponding to the sagittal plane may be defined by the point where the first two PCA eigenvectors intersect and one of the lateral eigenvectors as a normal vector to the mirror plane.

Furthermore, the method of processing model data may comprise selecting a first mirror plane based on two of the calculated PCA eigenvectors, e.g. based on the first and second eigenvectors, and displaying said first mirror plane. In response to a received input from a user to select another mirror plane, a second mirror plane is selected based on another combination of two PCA eigenvectors and subsequently displayed. In response to another received input from a user to select yet another mirror plane, a third mirror plane may be selected based on the last remaining combination of two PCA eigenvectors and subsequently displayed.

Alternatively, the first mirror plane may be selected based on one of the calculated PCA eigenvectors as normal vector to the mirror plane and the point where two PCA eigenvectors intersect. The second and third possible mirror planes may then be selected based on another eigenvector as normal vector to the mirror plane.

In accordance with the above aspect, the user can easily request another plane as mirror plane, e.g. by simply pushing a button or soft key of a medical device resulting in another mirror plane to be determined and displayed. Depending on whether the lengthwise direction of the body section is parallel to or perpendicular to its mirror plane, a different principal PCA component or eigenvector will be the eigenvector that is normal to the mirror plane. A medical practitioner can, however, immediately recognize if the displayed first mirror plane is not the correct or desired mirror plane, e.g. if the displayed mirror plane is not an expected sagittal but a coronal or transversal plane, in order to resolve the mathematical possible indetermination of the PCA analysis. Alternatively, the determined mirror plane could be compared with a predetermined reference mirror plane through anatomical mapping in order to select the correct mirror plane based on the calculated longitudinal and lateral axes. If the orientation of the determined mirror plane does not correspond to the orientation of the reference plane, another mirror plane will be determined based on another PCA eigenvector.

In accordance with an aspect of the invention, the longitudinal and lateral axes may be calculated by means of mathematical morphology. By way of example, mathematical morphology could be used to process the object imaging data in order to determine the geometrical shape and/or dimensions of the body section, e.g. by analysing the skeleton of the segmented structure. The determined geometrical shape could then be compared to the anatomical or morphological structure of a corresponding body section having no defects in order to determine the location of the longitudinal and lateral axes defining the mirror plane.

In accordance with an aspect of the invention, the method of processing model data may comprise providing object raw imaging data representing the body section and covering the healthy and the one or more defect, i.e. destroyed or even missing portions.

Parts of the object raw imaging data representing the one or more defect portions may be removed. As an example, data representing skull and/or mandible parts being separated from the skull and displaced and/or foreign bodies are removed yielding masked raw data. In particular, displaced parts which have been moved from their natural location should be removed prior to the mirroring procedure. This removal or masking process can be done manually or automatically using an image recognition algorithm.

With a segmentation process, the object raw data or the masked raw data are subjected to a thresholding process, which is preferably used for the registration of a body section with bone structure. Alternatively or additionally, the segmentation may include a morphological filtering process which is preferably used for the registration of a body section with soft tissue structure. Advantageously, the segmentation yields a defined boundary of the morphological structure of the body section.

In accordance with an aspect of the invention, the calculated longitudinal and lateral axes may be aligned with the principal axes defined by an imaging system used to collect the object imaging data, so that the longitudinal and lateral axes are parallel to the principal axes and/or an intersection point of the longitudinal with the lateral axes is identical to an intersection point of the principal axes. By way of example, the alignment may be carried out by a rotation or translation of the calculated longitudinal and lateral axes, wherein all imaging data points are transformed based on the same transformation.

By way of example, a Cartesian x-y-z coordinate system is attached to the isocenter of a scanner of an imaging system such that the z-axis points horizontally towards the foot end of the patient table, the y-axis points vertically upwards, and the x-axis points horizontally to the right. According to this example, the principal axes of the imaging system correspond to the x-, y- and z-axes.

By aligning the calculated longitudinal and lateral axes with the principal axes defined by the imaging system, a translation or rotation of the determined axes can be corrected that may result from a movement of the patient during the imaging procedure or from a skew or off-center position of the patient on the table during the imaging procedure so that his longitudinal axis is not in alignment with the longitudinal axis of the imaging table (the z-axis in the above example). More importantly, the alignment of the PCA axes with the axes of the imaging system facilitates a subsequent rigid and/or non-rigid registration of the mirrored data set with the original data set, as described below.

In accordance with a further aspect, the method may further comprise the steps of creating mirrored object data by mirroring the object imaging data using the mirror plane and subjecting the mirrored object data to a rigid registration process with the object imaging data. Advantageously, conventional registration algorithms as known from textbooks or scientific publications can be used for conducting this transformation of the mirrored object imaging data. The registration process may include at least one of translating, rotating, scaling and shearing of the object data.

The rigid registration offers the advantage that small errors in determining the mirror plane can be corrected, since due to the defect portions or removed defect portions, the calculated longitudinal and lateral axes may only approximate the mirror plane.

In order to adjust for existing differences on both sides of the body section since an anatomical structure is usually not perfectly axially symmetrical, the rigidly registered object imaging data may be subjected to a non-rigid registration process. Thus, both of the rigid and non-rigid registration processes may be combined in a two-step registration process.

The method may further comprise the step of creating reconstructed model data by fusing the registered object data with the original object data.

As a further advantage, the invention is not restrictive with regard to the type of object imaging data, which can be collected with any available imaging method. According to a preferred embodiment of the invention, the object data comprise 3D Computed Tomography (CT) or Magnetic Resonance (MR) image data of the body section of interest. CT or MR image data have advantages in terms of availability with practically used imaging devices and available image processing algorithms.

The object imaging data representing the body section include data with spatial coordinates, e.g. intensity values for each spatial point of the body section, or with spatial frequency coordinates. Typically, the above data are volume data, in particular 3D image data.

In accordance with yet another aspect of the invention, the accuracy of determining the mirror plane could be further improved by providing second object imaging data representing a sub-section of the body section and having no defect portions. In accordance with this aspect, a second longitudinal axis and a second lateral axis of the sub-section may be calculated based on the second object imaging data, and the mirror plane may be calculated or corrected based on the calculated second longitudinal and second lateral axes.

According to further aspects of the invention, a computer program product residing on a computer-readable medium and including a program code for carrying out the method as described above and a medical device comprising a computer-readable storage medium containing program instructions for carrying out the method as described above are provided.

BRIEF DESCRIPTION OF THE DRAWINGS

Further details and advantages of the invention are described in the following with reference to the attached drawings, which show in:

FIG. 1: a flow chart of the main steps of processing model data representing a body section of a biological organism according to an embodiment;

FIG. 2: a flow chart with further detailed steps of the model data processing method of FIG. 1 according to an embodiment.

DESCRIPTION OF THE PREFERRED EMBODIMENTS

Details of preferred embodiments are described in the following with particular reference to the features of determining the longitudinal and lateral axes of the body section based on which the mirror plane is determined. Features of collecting image data used as object raw imaging data, e.g. features of collecting 3D CT or MR image data are not described as any imaging process can be used, which is conventionally known. Furthermore, features of implementing particular data processing steps are not described as far as they are known in the art, such as conventional rigid or non-rigid registration techniques. The inventive method is conducted by implementing the method steps with a software program carried out on a computer or medical device. Programming details are not described as they are known as such from conventional software tools. Exemplary reference is made to the reconstruction of a portion of the human skull having a midfacial fracture, which represents a preferred embodiment of the invention. However, it is emphasized that the application of the invention is not restricted to the processing of model data of skulls, but could be applied to any mirror-symmetric body section.

FIG. 1 schematically illustrates the main steps of the inventive method of processing model data including a first step S1 of providing object imaging data representing the body section having one or more defect portions. Step S1 is conducted after a collection of patient raw imaging data with a medical imaging device 1, like e.g. a CT scanner or MRI scanner. As an example, the head of a patient is imaged with a CT scanner 1 using a conventional scanning protocol, wherein a 3D image of the patient's skull is extracted from the CT image. The imaged skull may have defect portions, e.g. as a result of a midfacial fracture.

The method includes a second step S2 of calculating a longitudinal axis and a lateral axis of the body section based on mathematical analysis of the object imaging data and a third step S3 of determining a mirror plane based on the calculated longitudinal and lateral axes. The mirror plane allows for reconstructing the one or more defect portions by mirroring one or more corresponding portions having no defects at the mirror plane.

A model generation and/or further data processing steps can be added depending on the particular requirements of the application.

Figure 3:
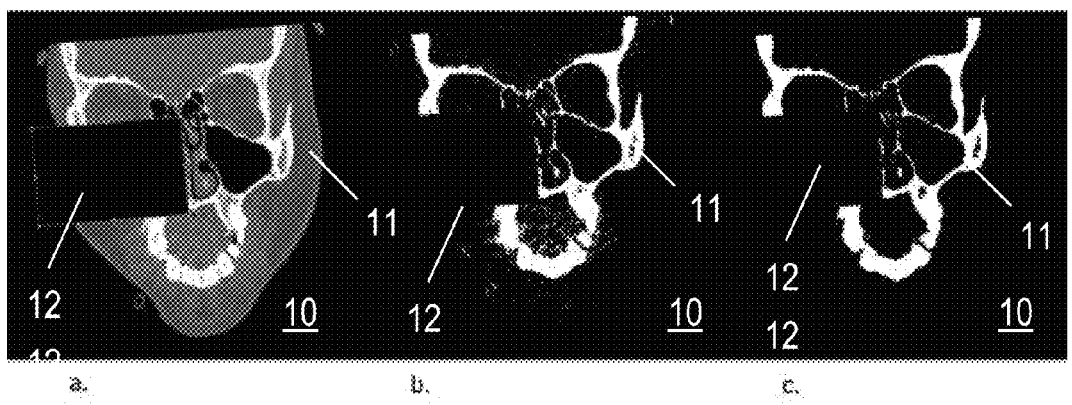
FIGS. 3, 4 and 5: exemplary skull image representations at different phases of the model data processing method according to an embodiment.
Figure 4:
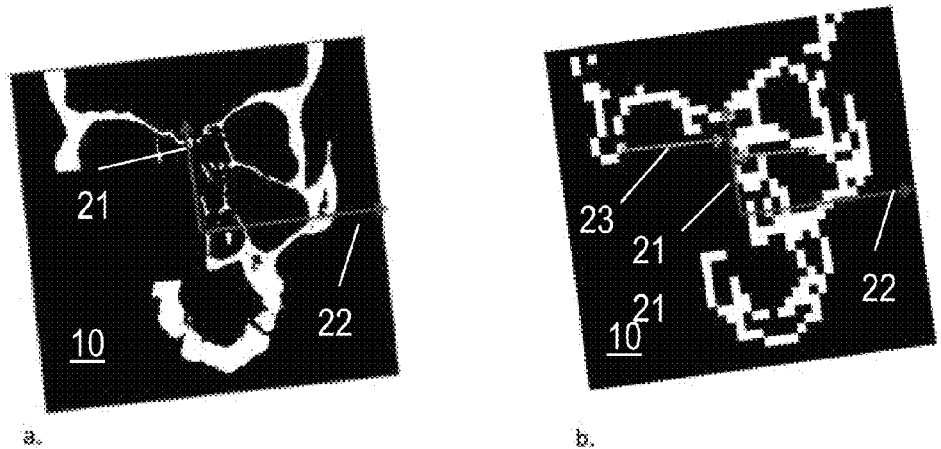
Figure 5:
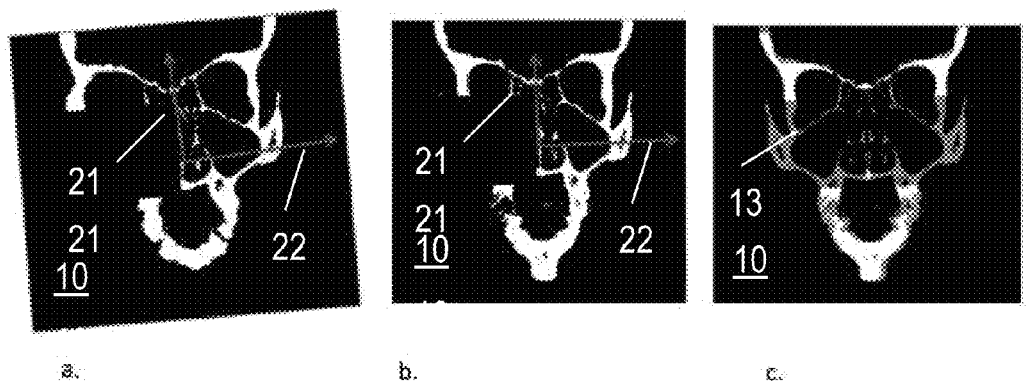

Another embodiment is illustrated in FIG. 2 and in FIGS. 3 to 5, exemplary illustrations of the image data are presented which are obtained with the steps in the flow chart of FIG. 2.

For providing the object imaging data (step S1 in FIG. 1), firstly, patient raw imaging data are provided (step S10). This can be done with an image data collection (medical imaging) immediately before the application of the inventive model data processing method or by transmitting patient raw data previously collected to a computer device including program instructions for carrying out the inventive model data processing method. The patient raw data comprise an image of the skull 10 including a healthy portion 11 and one or more defect portions (not visible in FIG. 3 since the defect portions have already been removed, as will be explained in step S11).

Subsequently, displaced fragments, e.g. bone portions separated from the healthy portions 11, e.g. due to a midfacial fracture, are removed in step S11. As an example, a manual removal of the displaced fragments and/or foreign bodies can be provided using a method of interactive editing. The displaced fragments and/or foreign bodies are marked on a display of the computer device e.g. by the surgeon. Subsequently, the marked portions are deleted from the patient raw data. As a result, image data essentially representing the healthy portion 11 are obtained as illustrated in FIG. 3a (left picture of FIG. 3), wherein the blank rectangular area 12 represents the removed portions that included the one or more defect portions of the skull 10.

Subsequently, the image data are subjected to a segmentation procedure (step S12), the result of which is depicted in FIG. 3b. The segmentation includes a thresholding for extracting only those image data which represent bone portions of the image. With CT images, this thresholding is simply implemented as the CT image density (intensity) of the bone portions strongly differs from the intensities of other parts of the head, e.g. the brain substance. Furthermore, so-called "flying pixels" are removed by a morphological filtering step ("opening") included in step S12 resulting in the complete object imaging data as illustrated in FIG. 3c.

In step S20, the PCA analysis calculates the longitudinal 21 and lateral 22 axes of the skull 10 based on the image data obtained in step S12. The PCA analysis is a mathematical procedure that uses an orthogonal linear transformation that transforms the three-dimensional coordinates of the segmented voxels of the skull 10 to a new coordinate system comprising a two-dimensional hyperplane. The basis vectors of this hyperplane correspond to the longitudinal axis 21 and to the lateral axis 22 of the skull 10 as shown in FIG. 4. By way of example, the first basis vector (longitudinal axis 21) or first principal component corresponds to a straight line that passes through the three-dimensional mean and minimizes the sum of squares of the distances of the voxels of the image 10 from the line, thus this direction has the largest variance of the data. The second basis vector (lateral axis 22) or second principal component is the direction with the second largest variance of the data and defines a plane together with the first principal component. As required, a third basis vector or third principal component can be calculated, e.g. to determine an alternative mirror plane based on the second and third basis vectors.

In step S21, the calculated longitudinal and lateral axis 21, 22 are aligned with the coordinate system and main axes of the imaging system used to collect the object imaging data, so that the longitudinal and lateral axes 21, 22 are parallel to the principal axes and the point of origin of the PCA axes 21, 22 coincides with the point of origin of the coordinate system of the imaging system. The alignment is carried out by an affine transformation, such as a rotation or translation of the calculated longitudinal and lateral axes. The required transformation is also applied to all voxels, i.e. to the entire set of object imaging data obtained in step S12 in order to align the entire body section, e.g. the skull with the axes of the imaging system.

Typically, the principal axes of the imaging system are described using a Cartesian x-y-z coordinate system attached to the isocenter of a scanner of the imaging system such that the y-axis points horizontally towards the foot end of the patient table, the z-axis points vertically upwards, and the x-axis points horizontally to the right. According to this example, the principal axes of the imaging system correspond to the x-, y- and z-axes.

If a patient is or has been lying in a skew position or off-center on the table so that his longitudinal axis is not in alignment with the longitudinal axis of the imaging table (the y-axis in the above example) or if the patient is moving during the imaging procedure, the determined longitudinal and lateral axes 21, 22 are not aligned with the x-y-z axes of the imaging system, making it more difficult for the medical practitioner to study the displayed image data. This is illustrated in FIG. 5a, which shows that the axes 21, 22 as well as the entire skull 10 are tilted in a counter-clockwise direction. After the alignment of step S21, the axes 21, 22 together with the entire image of the skull 10 are rotated to an upright position as shown in FIG. 5b.

Furthermore, the alignment of the PCA axes with the axes of the imaging system facilitates a subsequent rigid and non-rigid registration of the mirrored data set with the original data set, as described further below for steps S41 and S42.

After the alignment of step S21 as shown in FIG. 5b, the determined PCA axes 21, 22 that run through the mean of the data set can be used to select the mirror plane (not shown) in step S30. The mirror plane in the present embodiment corresponds to the sagittal plane (XZ plane) and is displayed in S31 on a display of a medical device (not shown). Thus, the mirror plane is the plane that is orthogonal to the second basis vector 22 and comprises the mean of the image data, i.e. the point of origin of the PCA coordinate system.

However, depending on the particular morphology or location of another body section, the mirror plane may be defined by a different basis vector that is orthogonal to the mirror plane. In other words, the mirror plane defined by the point of origin of the PCA axes and one basis vector that is orthogonal to the mirror plane is not uniquely defined.

A medical practitioner can, however, immediately recognize if the displayed first mirror plane is not the correct or de-sired mirror plane, e.g. if the displayed mirror plane is not an expected sagittal but a coronal plane, thereby resolving the inherent mathematical indetermination of the PCA analysis.

For this reason, the present embodiment offers to the user the possibility to request another mirror plane, in case the first mirror plane displayed in step S31 is not the correct one. If the user requests another mirror plane in step S32, the method proceeds to step S32 and a second mirror is selected based on another PCA eigenvector and subsequently displayed. If no alternative mirror plane is requested in step S32, the method proceeds directly to step S40.

In step S40, the object imaging data are mirrored on the determined mirror plane which creates image data for the removed portions 12 by mirroring the corresponding symmetrical portions on the healthy side of the mirror plane.

With the rigid registration (step S41), the mirrored data set is subjected to an affine transformation (e.g. by a translation, rotation, shearing) such that the similarity of the mirrored image data with the original object image data (except for the defect portions), is improved. With the rigid adaptation, smaller errors in the mirror plane can be corrected.

With a subsequent elastic, i.e. non-rigid registration in step S42, e.g. using a B-spline transformation which is a known non-rigid registration technique in the art, an adjustment is made for existing differences on both sides of the body section since an anatomical structure is usually not perfectly axially symmetrical.

Finally, in step S43, the mirrored and original object imaging data are fused with the original object imaging data. As a result, missing or defect portions, e.g. the impaired portions 13 of the skull 10, are automatically reconstructed, which is illustrated in FIG. 5c.

Subsequently, a virtual and/or real model can be made based on the reconstructed data.

The features of the invention in the above description, the drawings and the claims can be of significance both individually as well as in combination for the realization of the invention in its various embodiments.

What is claimed is:

1. Method of processing model data representing a body section of a biological organism, comprising the steps of:
   providing object imaging data representing the body section having one or more defect portions;
   calculating a longitudinal axis and a lateral axis of the body section based on a mathematical analysis of the object imaging data; and
   determining a mirror plane based on the calculated longitudinal and lateral axes, wherein said mirror plane allows for reconstructing the one or more defect portions by mirroring one or more corresponding portions having no defects at the mirror plane, wherein said determining comprises the steps of:
   selecting a first mirror plane based on first and second components of a principal component analysis or Karhunen-Loève-transformation;
   displaying said first mirror plane;
   receiving input from a user, using a processor, to select another mirror plane after said first mirror plane is displayed,
   in response to the received input from the user to select the another mirror plane, selecting a second mirror plane based on first and third components or based on second and third components of the principal component analysis or Karhunen-Loève-transformation; and
   displaying said second mirror plane.

2. Method according to claim 1, wherein the longitudinal and lateral axes are calculated by use of a principal component analysis or Karhunen-Loève-transformation.

3. Method according to claim 1, wherein the longitudinal and lateral axes are calculated by use of mathematical morphology.

4. Method according to claim 1, further comprising the step of aligning the calculated longitudinal and lateral axes with principal axes defined by an imaging system used to collect the object imaging data, so that at the least the longitudinal and lateral axes are parallel to the principal axes or an intersection point of the longitudinal axis with the lateral axis is identical to an intersection point of the principal axes.

5. Method according to claim 1, further comprising the steps of:
   creating mirrored object data by mirroring the object imaging data using the mirror plane; and
   subjecting the mirrored object data to a rigid registration process with the object imaging data, including at least one of translating, rotating, scaling and shearing of the object data.

6. Method according to claim 5, further comprising the step of subjecting the rigidly registered object imaging data to a non-rigid registration process.

7. Method according to claim 5, further comprising the step of creating reconstructed model data by fusing registered object data with original object data.

8. Method according to claim 1, wherein the step of providing the object imaging data comprises:
   providing object raw imaging data representing the body section; and
   creating the object imaging data by removing portions of the object raw imaging data which represent the one or more defect portions.

9. Method according to claim 8, wherein the removed portions of the object raw imaging data correspond to a portion of the body section having a defect.

10. Method according to claim 1, wherein the step of providing the object imaging data comprises subjecting the object imaging data to a segmentation including at least one of a thresholding process and a filtering process.

11. Method according to claim 1, wherein the body section comprises at least one of a skull, a head or part thereof, and the calculated longitudinal and lateral axes correspond to the longitudinal and lateral axes of the head, or skull or part thereof.

12. Method according to claim 1, comprising the steps of:
   providing second object imaging data representing a sub-section of the body section and having no defect portions;
   calculating a second longitudinal axis and a second lateral axis of the sub-section based on the second object imaging data; and
   selecting or correcting the mirror plane based on the calculated second longitudinal and second lateral axes.

13. Method according to claim 1, wherein a size of the body section used for imaging is selected such that a size of the one or more defect portions is smaller than 50% of the size of the body section.

14. Computer program residing on a computer-readable non-transitory memory, with a program code stored in said memory for carrying out the method according to claim 1.

15. Medical device, comprising a processing unit configured to carry out the method according to claim 1.

* * * * *